3,511,858
FERROCENYLMETHYLAZIDE
Donald E. Bublitz, Concord, Calif., assignor to The Dow Chemical Company, Midland, Mich., a corporation of Delaware
No Drawing. Filed Mar. 5, 1968, Ser. No. 710,625
Int. Cl. C07f 15/02; A01n 9/20
U.S. Cl. 260—349               1 Claim

ABSTRACT OF THE DISCLOSURE

Disclosed is the new compound ferrocenylmethylazide which is useful as an insecticide.

This invention relates to a new insecticide. It more particularly is concerned with the novel compound ferrocenylmethylazide and the surprising discovery of its novel usefulness as an insecticide.

Of the many synthetic insecticides heretofore described and used, most belong to the general classes of organic compounds which contain or incorporate halogen, thiocyanate, nitro, nitrile, and phosphate derived groups.

Now it has been discovered that ferrocenylmethylazide has utility as an insecticide. Thus, for example, this compound has demonstrated its usefulness in controlling such arthropods or insects as the two-spotted spider mite, housefly, cockroach, and the confused flour beetle when such are contacted with an insecticidal amount thereof. This discovery is indeed surprising for certain related, but different ferrocene derivatives are not known as exhibitors of insecticidal activity and, in fact, are devoid of such activity. Many if not most of the known ferrocene derivatives are subjects of chemical curiosity, synthesis, or reaction mechanistic studies. Some are used as catalysts, among other things.

Ferrocenylmethylazide, otherwise referred to as ((azidomethyl) cyclopentadienyl)cyclopentadienyl-iron, is novel and may be represented by the following structural formula

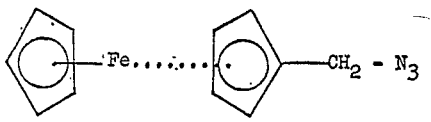

It is identifiable as an orange solid having a melting point of 32–34° C.

This novel compound can be prepared by contacting ferrocenylmethyltrimethylammonium halide, notably the iodide or bromide, with an aqueous solution of sodium aizde. This method is generally conducted utilizing a stoichiometric excess of the azide reagent in comparison to the ferrocenylammonium salt. Conveniently, the ratio of reactants may range upwards of a tenfold or more excess of the azide without deleterious effects. An elevated temperature is employed in the reaction, ranging from about 50° to about 150° C. Usually, a temperature of about 90° C. to 100° C. is used for a period of several hours. Extraction of the reaction mixture and column chromatography of the extracts, for example with partially deactivated alumina, are means by which isolation and purification of the product are accomplished. Conventional identification procedures may be used to confirm the preparation of the ferrocenylmethylazide hereof. The starting compounds for this preparation, for example, ferrocenylmethyltrimethylammonium iodide, are known and readily available materials.

In its use as an insecticide, an insecticidal amount of ferrocenylmethylazide per se or a composition incorporating an insecticidal amount of ferrocenylmethylazide is used as the toxicant for contact with the pest insect. The insecticidal amount, of course, is that quantity which elicits toxic mortality among the treated pests. Generally, such insecticidal response results by contacting the target pests with a composition containing from 25 to 1000 or more parts of ferrocenylmethylazide per million parts of total composition or an equivalent amount of the ferrocenylmethylazide per se. Good results are achieved upon contact with a composition containing about 500 parts ferrocenylmethylazide per million by weight.

Suitable compositions include those which are in the form of liquid solutions, liquid emulsifiable concentrates, and dust or granular concentrates. Such can be further diluted as and where appropriate with conventional diluents.

Liquid compositions containing ferrocenylmethylazide are prepared by dissolving the active compound in an organic solvent such as acetone, toluene, xylene, methylene chloride, chlorobenzene, ethylether, ethyl alcohol or petroleum distillates or by dispersing the active compound in water with or without the aid of a suitable surface acting dispersing agent such as can be provided by ionic or nonionic dispersing and emulsifying agents.

The aqueous compositions may contain one or more water-immiscible solvents for the toxicants. In such compositions, the carrier comprises an aqueous emulsion, that is, a mixture of water-immiscible solvent, emulsifying agent and water. The choice of dispersing and emulsifying agent and the amounts thereof employed is dictated by the nature of the composition type and by the ability of the agent to facilitate the dispersion of the active toxicant compound in the aqueous carrier to produce the desired composition. Dispersing and emulsifying agents which may be employed in the compositions include the condensation products of alkylene oxides with phenols and organic acids, alkylarylsulfonates, polyoxyethylene derivatives or sorbitan esters, complex ether alcohols, mahogany soaps, and the like. In such compositions, the surface active agents are usually employed in the amount of from 1 to 20 percent by weight of the combined weight of the surface active agent and the active compound. A preferred embodiment of the invention consists of a petrolatum distillate (usually, kerosene) solution of the active ferrocenylmethylazide.

In the preparation of dust compositions, the active ferrocenylmethylazide is dispersed in and on a finely divided inert solid such as talcum, chalk, gypsum, and the like. In such operations, the carriers are mechanically ground with the compounds or wet with a volatile organic solvent solution thereof. Similarly, dust compositions containing the compound may be prepared from bentonite, fuller's earth, attapulgite, and other clays. Depending upon the proportions of ingredients, these dust compositions may be employed as concentrates and subsequently diluted with additional solid surface acting dispersing agent or with talic, chalk, or gypsum and the like to obtain a desired amount of active agent in a composition adapted to be applied for insect control. Also, such concentrate dust compositions may be dispersed in water with or without the aid of a dispersing agent to form spray mixtures.

Granular formulations are conveniently prepared by impregnations, such as through simple mechanical mixing, of the active ferrocenylmethylazide compound in a pre-sized carrier, usually of the type herebefore set forth.

In practice, the active ferrocenylmethylazide is distributed so as to provide contact of the target insect with toxic amounts of the active compound. Such contact can be achieved through direct contact of the active compound with the target insect or by more indirect means such as by application to its food and/or habitat. Thus, for example, the active compound hereof or a composition thereof can be spread throughout the environs of the target host so as to both provide direct and indirect contact thereof or bait compositions incorporating a toxic amount of the active compound or composition thereof can be readily prepared and strategically located so as to provide ultimate contact of the host species therewith.

The following examples serve to further typify the nature of the present invention and are given solely for the purpose of illustration.

EXAMPLE 1

25 parts by weight of ferrocenylmethylazide, 60 parts of fuller's earth, 10 parts of diatomaceous earth, 3 parts of an alkyl aryl sulfonate (Naccanol NR) and 2 parts of a polymerized sodium salt of a substituted benzoid alkyl sulfonic acid (Daxad No. 27) are mechanically mixed and ground together to prepare a concentrate composition in the form of a wettable powder.

Similarly, 25 parts by weight of ferrocenylmethylazide, 65 parts xylene and 10 parts of a dimeric alkylated aryl polyether alcohol (Triton X–155), are mechanically mixed together to prepare a liquid emulsifiable concentrate composition.

In a like manner, 6 parts by weight of ferrocenylmethylazide, 2 parts of Naccanol NR, 2 parts of Daxad No. 27, and 200 parts of water are ballmilled together to prepare a concentrate composition in the form of a water dispersible liquid.

These concentrate compositions may be further diluted in their concentrate state and/or dispersed in water to prepare aqueous compositions which have desirable wetting and penetrating properties. These compositions are adapted to be employed to treat target insect life and thus distribute ferrocenylmethylazide to provide contact of such insect life in insecticidal concentrations.

EXAMPLE 2

Following the procedure of Example 1, a water-emulsifiable concentrate is prepared containing ferrocenylmethylazide. This concentrate is thereafter dispersed in water to form a corresponding aqueous dispersion containing 500 parts of ferrocenylmethylazide per million parts of the ultimate aqueous dispersion. This aqueous dispersion is thereafter applied so as to wet thoroughly the above-ground parts of cranberry bean (*Phaseolus vulgaris* L.) plants which are serving as the host for and are heavily infested with the adult stages of two-spotted spider mite (*Tetranychus bimaculatus*). A further group of cranberry bean plants which are also heavily infested with the two-spotted spider mite is left untreated to serve as a check. The treated plants and the check plants are held for 3 to 6 days and thereafter observed to determine mortality of mites. It is observed and recorded at the end of this time that the ferrocenylmethylazide achieves a 98 percent kill of the two-spotted spider mite. Each of the check plants is found to still be in a state of complete mite infestation.

EXAMPLE 3

An aqueous dispersion containing 500 parts of ferrocenylmethylazide per million parts of composition is prepared as described in Examples 1 and 2. Adult confused flour beetles are momentarily dipped into this thus prepared aqueous dispersion and thereafter placed on absorbent paper to remove excess solution and dried before being placed into separate receiving containers in which they are thereafter allowed to enjoy a life-supporting environment. Three days following treatment, the beetles are examined and mortality counts made. On the basis of this examination, it is observed and recorded that a 100 percent kill is achieved of the beetles treated with the ferrocenylmethylazide.

A similar experiment conducted concurrently with the foregoing but without the use of the active ferrocenylmethylazide compound results in a colony of unaffected confused flour beetles which appear in a state of healthy life.

EXAMPLE 4

The procedure outlined in Example 3 above is repeated using the American cockroach as the test species. A 100 percent kill of the cockroach is observed and recorded whereas none are affected in a concurrently run check experiment.

EXAMPLE 5

A 100 percent kill with fair knockdown of adult houseflies is achieved upon treatment thereof with an aqueous dispersion composition containing 500 parts of ferrocenylmethylazide per million parts of total composition applied in the manner described in Examples 3 and 4 above.

EXAMPLE 6

A mixture of 23 grams of ferrocenylmethyltrimethylammonium iodide (dimethylaminomethoferrocene methiodide), 23 grams of sodium azide, and 230 milliliters of water is maintained at from 90° to 100° C. for 6 hours. The reaction mixture is then allowed to cool to room temperature and is thereafter extracted with several portions of ethyl ether. The ethyl ether extracts are evaporated in vacuum leaving an orange oil. The latter is dissolved in hexane and the resulting solution is thereafter passed through a column of partially deactivated alumina. Evaporation of the eluate furnishes ferrocenylmethylazide as an orange solid, melting point 32°–34° C. Infrared characterization confirms the identity of the product.

What is claimed is:

1. Ferrocenylmethylazide.

References Cited

UNITED STATES PATENTS 3,290,337 12/1966 Kozikowski et al. ---- 260—349

HENRY R. JILES, Primary Examiner

J. M. FORD, Assistant Examiner

U.S. Cl. X.R.

424—226